Figure 3:
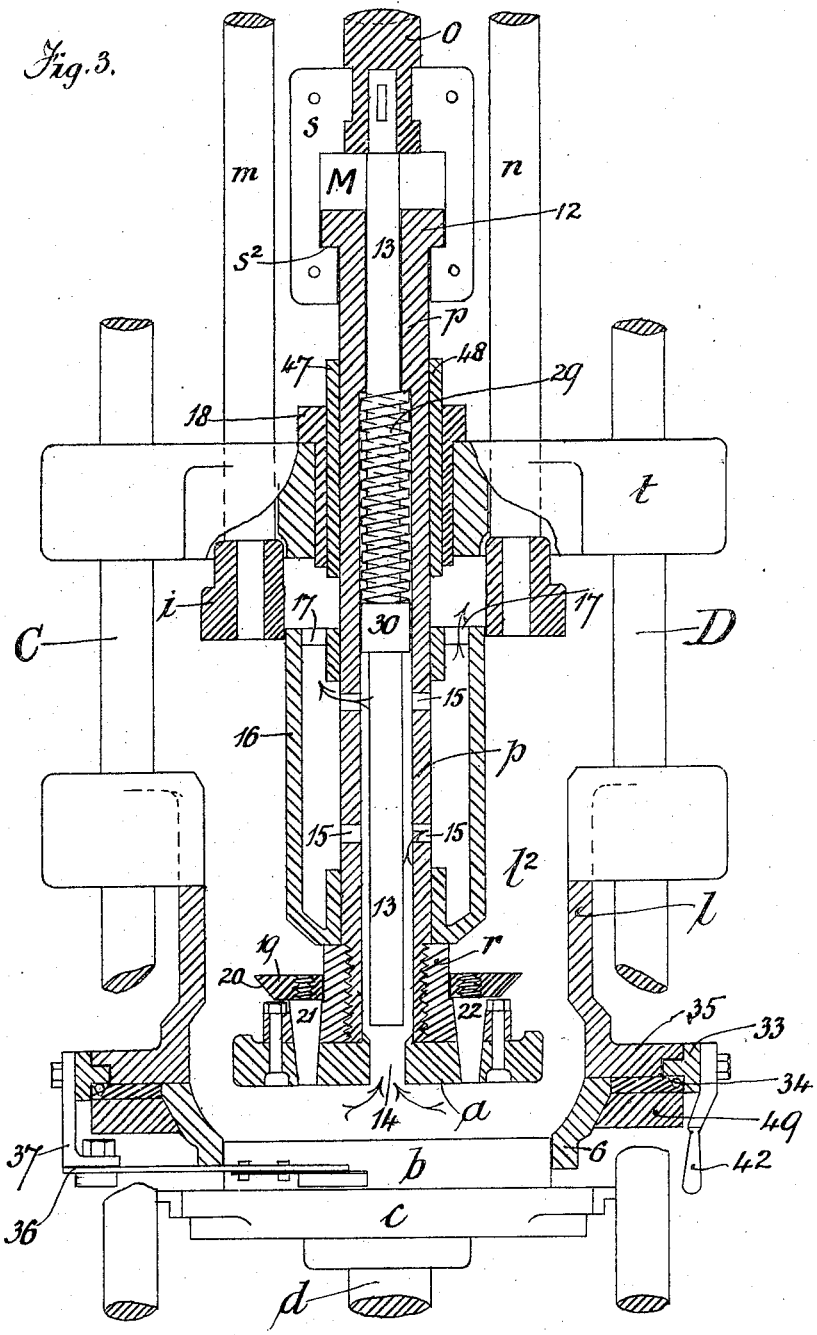

No. 775,706. PATENTED NOV. 22, 1904.
E. W. LEIGH.
PRESS OR MACHINE FOR MAKING SAGGERS OR SIMILAR ARTICLES.
APPLICATION FILED JULY 15, 1902.
NO MODEL. 4 SHEETS—SHEET 1.
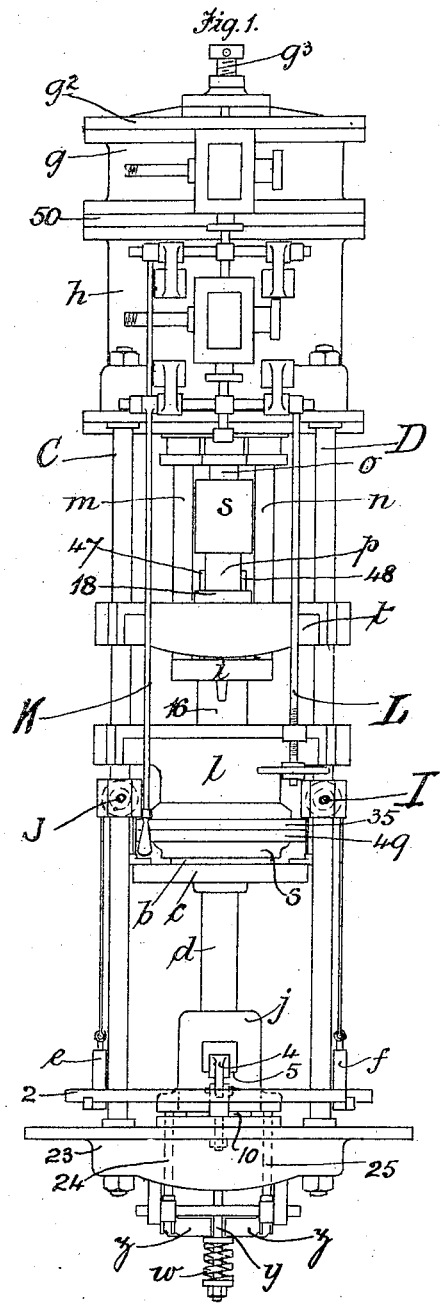
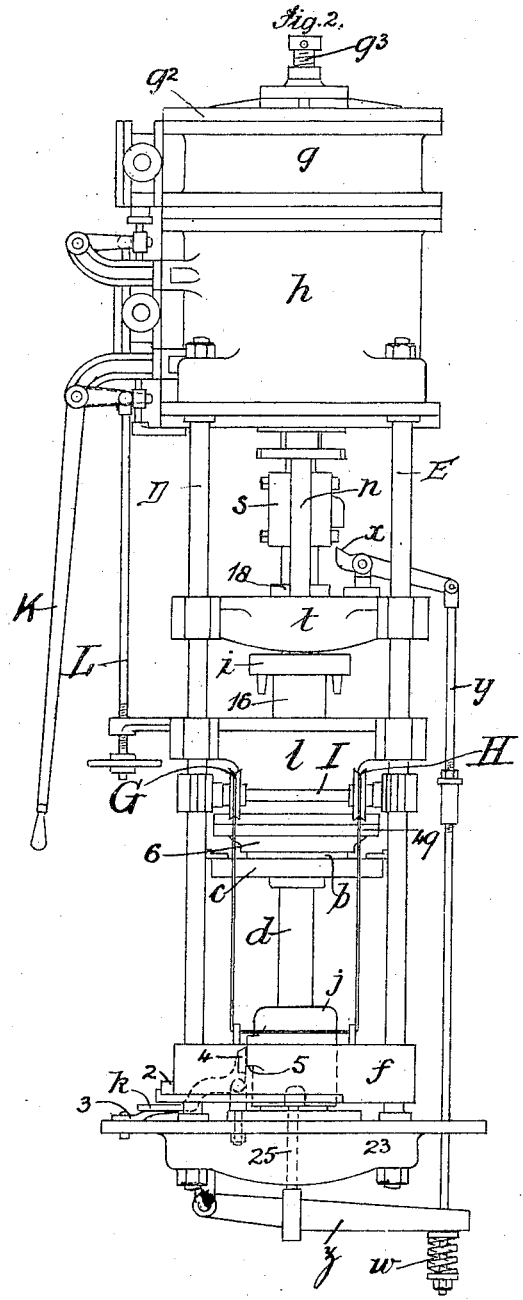
Witnesses:
John Henry Cockertiell
Edward Wilton Davies-Rees.
Inventor,
Edmund William Leigh No. 775,706. PATENTED NOV. 22, 1904.
E. W. LEIGH.
PRESS OR MACHINE FOR MAKING SAGGERS OR SIMILAR ARTICLES.
APPLICATION FILED JULY 15, 1902.
NO MODEL. 4 SHEETS—SHEET 2.

Witnesses:
John Henry Copestake
Edward Wilton Davies-Rees.

Inventor,
Edmund William Leigh

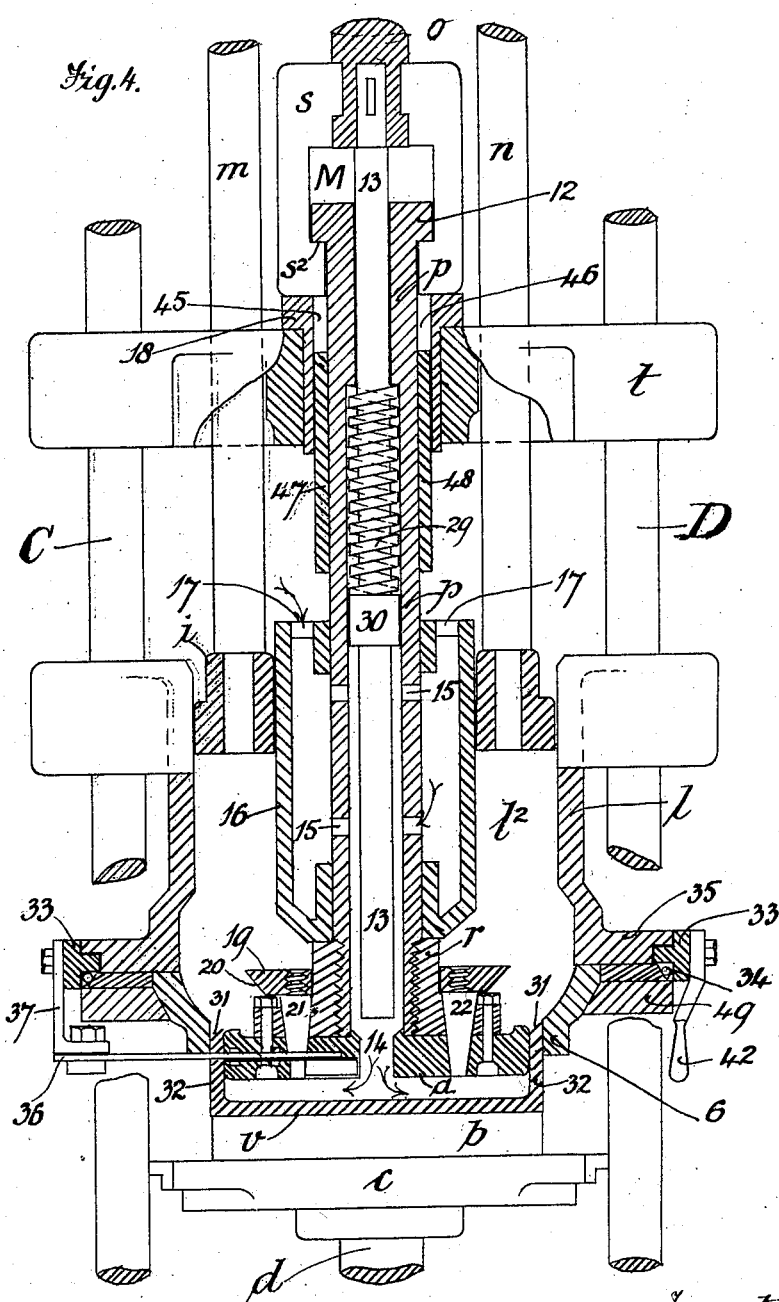

No. 775,706. PATENTED NOV. 22, 1904.
E. W. LEIGH.
PRESS OR MACHINE FOR MAKING SAGGERS OR SIMILAR ARTICLES.
APPLICATION FILED JULY 15, 1902.
NO MODEL. 4 SHEETS—SHEET 4.
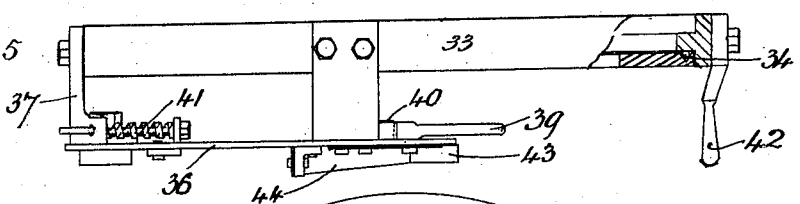
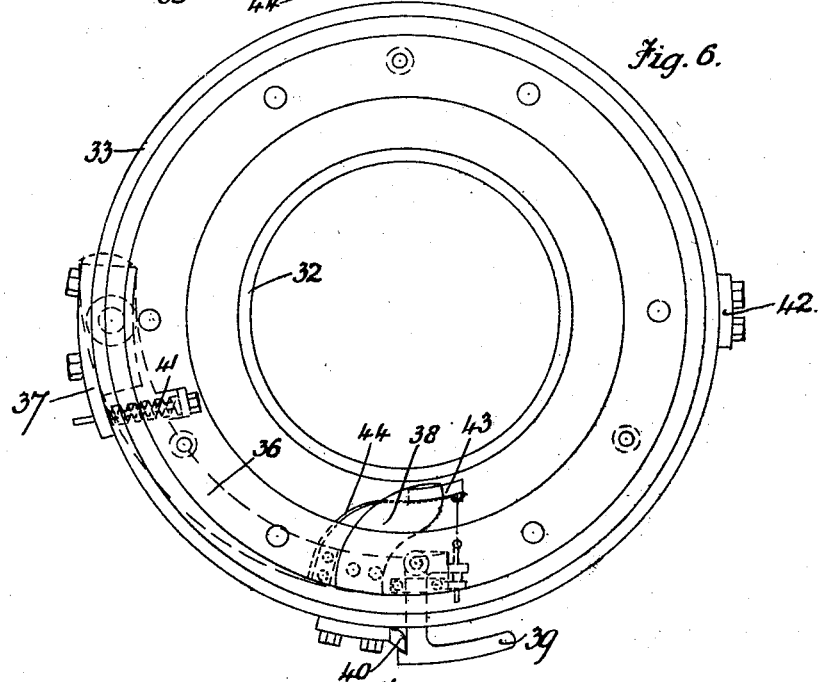
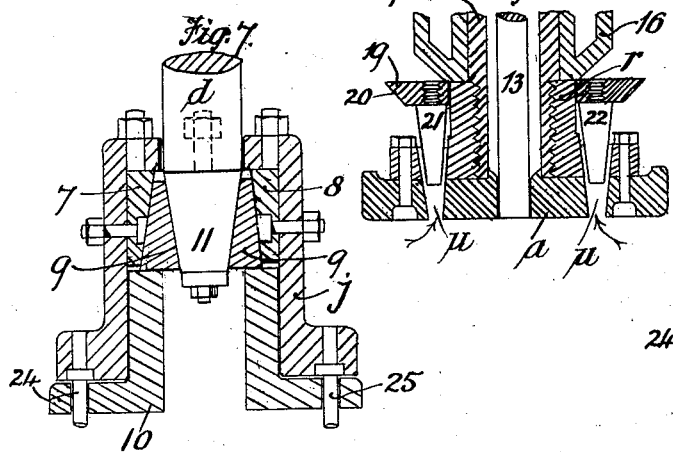
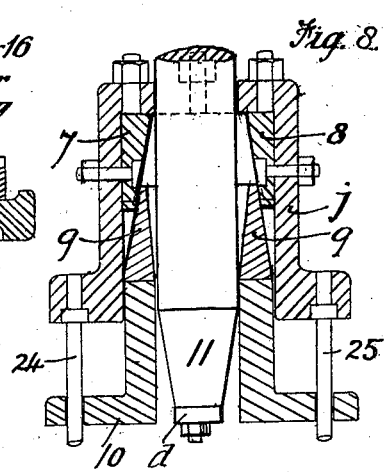
Witnesses:
John Henry Copestake
Edward Wilton Davies-Rees.
Inventor:
Edmund William Leigh No. 775,706. Patented November 22, 1904.

UNITED STATES PATENT OFFICE.

EDMUND WILLIAM LEIGH, OF STOKE-UPON-TRENT, ENGLAND.

PRESS OR MACHINE FOR MAKING SAGGERS OR SIMILAR ARTICLES.

SPECIFICATION forming part of Letters Patent No. 775,706, dated November 22, 1904.

Application filed July 15, 1902. Serial No. 115,686. (No model.)

*To all whom it may concern:*

Be it known that I, EDMUND WILLIAM LEIGH, of Cobridge, Stoke-upon-Trent, in the county of Stafford, England, have invented an Improved Press or Machine for Making "Saggers" or Similar Articles; and I do hereby declare that the following is a full, clear, and exact description thereof.

Hitherto the bottom and sides or surrounding wall of saggers, slop-sinks, and similar articles having one closed end have been made separately and joined or pressed together before being fired.

My invention consists in making such articles having one closed end with their bottom and sides complete in one portion.

Figure 1 is a front elevation of my improved press or machine. Fig. 2 is a side elevation of Fig. 1. Fig. 3 is an enlarged view, partly in section, of the hollow pressing-ram and outer ram of such machine shown at the upper end of their stroke. Fig. 4 is a similar view to Fig. 3, but showing the hollow ram at the bottom of its stroke. Fig. 5 is an enlarged elevation of the cutting appliance of such machines shown detached therefrom. Fig. 6 is a plan view of Fig. 5. Fig. 7 is an enlarged sectional elevation of the locking-gear, shown closed, for supporting the mold-box pillar. Fig. 8 is a similar sectional elevation to that shown at Fig. 7, the cover being raised, the divided ring open, and supporting-pillar descending; Fig. 9, a sectional elevation of the lower portion of the hollow ram of such machines.

The construction of such press is as follows:

I mount two steam-cylinders $g$ $h$, with a dividing-cover 50 between them, upon four pillars C D E F, secured at their lower ends to base-plate 23, such cylinders being provided with pistons, and piston-rods $m$ $n$ $o$ having a ram-head $i$ and divided coupling $s$, secured to their lower ends. A cross-piece $t$ is fixed between the supporting-pillars, through which passes a bush 18, secured therein by set-pins, said bush having keyways 45 and 46. A hollow ram or shaft $p$ passes through this bush and its enlarged end or collar 12 is slidably secured in the coupling $s$.

47 and 48 are keys formed on the ram for engaging the keyways in the bush.

16 is a jacket secured to and surrounding the ram and communicating with the interior thereof through openings 15 and having openings 17 in the top thereof communicating with the atmosphere.

A block $r$ is secured to the lower end of the ram, to which is secured a die-block $a$, having an opening 14 in the center thereof communicating with the interior of the ram, and holes $u$, into which fit pegs 21 22, secured to a plate 19, surrounding block $r$. To the lower end of piston-rod $o$ is secured the upper end of an air-valve spindle 13, which depends through the hollow ram and is adapted to close opening 14. A spiral spring 29, resting on a collar 30, formed on the spindle 13, bears against a shoulder formed on the interior of the ram and serves to keep the ram with its collar 12 pressed against the end of piston-rod $o$. The coupling $s$ is formed with an interior space M, into which collar 12 fits so as to have a limited sliding movement therein, so that ram $p$ may continue to move downwardly after piston $o$ has stopped.

A mold-box $l$ is secured between the supporting-pillars below the cross-piece $t$ and having a ring 33, mounted on ball-bearing 34, secured to its flange 35, a curved arm 36, and a knife-blade 38, mounted on such ring, being used as a severing appliance. A handle 42 is secured to the ring 33 for operating the said severing appliance.

The inner periphery of ring 6, secured by flange 49 to the mold-box, is for shaping the outer surface of saggers and other articles, $c$ being a table horizontally mounted upon the upper end of a falling and rising pillar $d$, forming the bottom of mold-box, having a plate $b$ fixed to its upper surface by bolts and slidably fitting within rings 6, and upon which the bottom of an article is formed, the table being balanced by weights $e$ $f$, connected to the ends of a length of rope or chain passing over grooved wheels G H, secured on shafts I J, supported at their ends by bearings secured to the supporting-pillar.

A hollow block 10, having a divided ring 9, mounted on same, is secured to the upper surface of base-plate 23, with a slidable cover *j*, having a tapered ring 7 therein, through which pillar *d* rises and falls.

The lever *x* is pivoted to the upper surface of cross-piece *t*, having the upper end of rod *y* pivoted to its outer end, which rod *y* has a spring *w* around its lower end supporting the free ends of lever *z*, the other ends of which are pivoted to the under side of base-plate 23 and support rods 24 25, connected at their upper ends to the lower end of slidable cover *j*.

*k* is a lever engaging a projection 5 on the cover *j* and forced by a spring 3 to keep the cover raised.

2 is a foot-rail connected to the weights *e f*.

The operation of my press or machine is as follows: After securing a suitably-shaped die-block *a* to the block *r*, an outer ring 6 to flange 35 of mold-box *l*, a plate *b* to the upper surface of table *c*, I lubricate the under side of such die-block and the upper surface of plate *b*. Then I admit steam to the under side of pistons in cylinders *g h* by operating handle K and wheel-rod L to raise outer ram *i* and die-block *a* to the upper end of their stroke. Presuming the inner end 4 of lever *k* is forced by spring 3 beneath projection 5 on cover *j* to keep same in its raised position, then by standing on foot-rail 2, connected to weights *e f*, pillar *d* is raised to force table *c* up adjacent to die-ring 6, so that die-plate *b* will project into such ring. (See Fig. 3.) By depressing the outer end of lever *k* to withdraw its inner end 4 from beneath projection 5, cover *j* is permitted to fall by gravity to force ring 7 against divided ring 9, slidable horizontally on the upper end of block 10 to cause said divided ring to jamb against the tapered lower end 11 of pillar *d* to support same and retain table *c* up adjacent to ring 6. (See Figs. 7 and 8.) Clay or like plastic material is now placed into interior *l²* of mold-box *l* and steam diverted by operating the cylinder-valve from the under to the upper side of piston in cylinder *h* to force outer ram *i* downward to compress such material and force some of it between raised die-block *a* and plate *b*, the quantity being about three times the amount required to insure the bottom of an article being compact when finally pressed, air in such space being driven by the material through opening 14 in die-block, holes 15 in hollow ram, and openings 17 in the upper end of jacket 16 in the direction indicated by arrows, Fig. 3. Steam is now shut off from cylinder *h*, the outer ram *i* remaining stationary, and steam diverted from the under side to the upper side of piston in cylinder *g* to force the lower end of its rod *o* down onto the head 12 of hollow ram *p* and lower end of air-spindle 13 down into opening 14 level with the under side of die-block *a* (see Fig. 9) to push out any clay which may have entered it and cause such die-block to compress the plastic material to the required thickness for a sagger-bottom, the plate 19 being kept stationary by clay forced beneath and around its beveled periphery 20, while steam in the cylinder *g* forces such die-block away from such plate and its depending pegs 21 22 to cause a vacuum between block *r* and the said plate to draw air up (see arrows, Fig. 9) and permit surplus clay to pass up through peg-holes *u*. It will be seen that as soon as coupling *s* comes in contact with the bush 18 the movement of the ram *p*, with its die-block *a*, stops and the bottom of the sagger is complete. Thus the thickness of the bottom is controlled by the point of contact of the coupling with the bushing 18. This bushing is adjustable by means of the set-pins. The inner end of lever *x* having been depressed by coupling *s* raises its outer end and rod *y* to compress spring *w*, which forces rods 24 25 and cover *j* upward, cover *j* carrying ring 7 up with it. Thus the divided ring 9 is allowed to expand, thus removing its grip from the tapered end of the pillar *d*. Steam-pressure is now readmitted to the top side of piston in cylinder *h* to force clay beneath ram *i* onto plate 19 to force it down onto block *r*, and the continued pressure on plate 19 overcomes the pressure of spring 29 and the collar 12 of ram *p* moves from the top to the bottom of space M in coupling *s*, and die-block *a* is thus forced into ring 6 until its under side is about an inch lower than the lower end of such ring, (see Fig. 4,) the clay being extruded through peripheral opening 31 by ram *i* to form its sides 32, air passing down through holes 17 in upper end of jacket 16, holes 15 in hollow ram *p*, and opening 14 in die-block *a* (see arrows, Fig. 4) to the interior of such sagger, while its sides are being formed to prevent same being collapsed by external air-pressure. Steam is now diverted from the upper side to the under side of piston in cylinder *h* to stop descent of ram *i*, table *c*, and the extrusion of clay when the required depth has been attained, die-block *a* remaining stationary. By first releasing handle 39 from catch 40 spring 41 will force blade 38, fixed to arm 36, pivoted to bracket 37, through sagger side 32 and against die-block *a*. Then by rotating ring 33 by handle 42 on its ball-bearing 34 the upper end of such formed sagger is severed by the said blade from clay in mold-box *l*, block or angle-piece 43, secured to spring 44, following such blade, smoothing down the bur formed during such cutting operation. Table *c* is now depressed by hand to release the upper end of sagger from die-block *a* to permit its removal from plate *b* for being fired. A bolt $g^3$ in cover $g^2$ of cylinder *g* regulates the upward stroke of such ram and die-block by the upper end of piston-rod *o* in its descent coming into contact with its lower end.

Such press can be used for making saggers of various shapes and sizes by first detaching flange 49 from flange 35, removing ring 6 from within flange 49, die-block *a* from block *r*, and plate *b* from table *c*, and substituting other similar parts.

By using a press constructed as described with the required shape of die-block and attendant parts, saggers, slop-sinks, wash-bowls, jars, and other articles of various sizes of a superior quality can be made of or from prepared clay or similar plastic material in one portion, expeditiously, compact, uniform, and cheaper with less liability to fracture during drying, firing, and use, than those hitherto made.

What I desire to claim, and secure by Letters Patent, is—.

1. A press for making receptacles having one closed end comprising a mold-box, having a movable bottom, an inner piston having a stem, an outer piston surrounding said stem and means for operating said pistons, substantially as described.

2. A press for making receptacles having one closed end, comprising a mold-box having a movable bottom, a hollow piston having an opening at its lower end, a second piston surrounding the same and means for reciprocating the pistons, substantially as described.

3. In combination with a mold-box having a movable bottom, a hollow piston having an opening at its lower end, a jacket surrounding said piston and having openings communicating with the interior thereof and openings to the atmosphere, a second piston surrounding the jacket and means for operating said pistons, substantially as described.

4. In combination with a mold-box having a movable bottom, a hollow ram, a die-plate secured thereto having a hole 14 communicating with the interior of the ram, said plate also having holes *u* therein, a plate 19 surrounding the ram, plugs secured to said plate and entering the holes *u* in the die-plate and a piston surrounding the ram, substantially as described.

5. In combination with a mold-box having a movable bottom, inner and outer pistons and independent cylinders for operating said pistons, substantially as described.

6. In combination with a mold-box having a movable bottom, a rod *o*, a coupling *s* secured to the end thereof, a ram having its head slidably secured in the coupling, a cross-piece, a bushing therein against which the coupling abuts, a die-plate at one end of the ram and an outer piston surrounding said ram, substantially as described.

7. In combination with a mold-box having a movable bottom, a rod *o*, a coupling *s*, secured to the end thereof, a ram having one end secured in said coupling and having a limited sliding movement therein, means for normally holding said ram at the upward limit of its movement in said coupling, means for limiting the downward movement of the coupling, a die-plate on the end of the ram and a piston surrounding the ram, substantially as described.

8. In combination with a mold-box having a movable bottom, a piston *i*, a rod *o*, a ram secured thereto, a die-plate at one end of the ram, means for reciprocating the piston *i* and rod *o* and means whereby the ram may continue its downward movement after the rod *o* comes to rest, substantially as described.

9. In combination with a mold-box, reciprocating pistons operating therein, a pillar below said box, a plate secured to the top thereof, said plate forming the bottom of the box, means for raising and lowering said pillar, said means comprising a split tapered ring suitably supported on the frame, a second tapered ring adapted to slide over the first ring and a cover fitting over said rings and being adapted to press the rings together so as to lock the pillar in raised position and means for unlocking said pillar, substantially as described.

10. In combination with a mold-box, pistons operating therein, a plate forming the bottom of the box, means for raising and lowering said plate, means for locking it in raised position and means for unlocking said plate, said means being operated by the movement of one of the pistons, substantially as described.

In testimony whereof I have hereunto set my hand, in the presence of two witnesses, this 30th day of June, 1902.

EDMUND WILLIAM LEIGH.

Witnesses:
EDWARD WILTON DAVIES-REES,
FREDERICK BARRATT.